US008856200B2

(12) United States Patent  (10) Patent No.:  US 8,856,200 B2
Yonemura  (45) Date of Patent:  Oct. 7, 2014

(54) EXPONENTIATION CALCULATION APPARATUS AND EXPONENTIATION CALCULATION METHOD

(75) Inventor: Tomoko Yonemura, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1300 days.

(21) Appl. No.: 12/233,626

(22) Filed: Sep. 19, 2008

(65) Prior Publication Data

US 2009/0083351 A1   Mar. 26, 2009

(30) Foreign Application Priority Data

Sep. 26, 2007  (JP) ................. 2007-250088

(51) Int. Cl.
*G06F 7/00*  (2006.01)
*G06F 7/72*  (2006.01)
(52) U.S. Cl.
CPC ..................................... *G06F 7/726* (2013.01)
USPC .......................................................... 708/492
(58) Field of Classification Search
CPC .......... G06F 7/724; G06F 7/725; G06F 7/726
USPC ................................................. 708/491, 492
See application file for complete search history.

(56) References Cited

U.S. PATENT DOCUMENTS

| 7,299,253 | B2 * | 11/2007 | Lambert | 708/492 |
| RE40,710 | E * | 5/2009 | Yokota et al. | 341/50 |
| 8,111,826 | B2 * | 2/2012 | Takashima | 380/28 |
| 2008/0077645 | A1 * | 3/2008 | Lambert | 708/492 |

OTHER PUBLICATIONS

Shirase, et al., "Some Efficient Algorithms for the Final Exponentiation of $_{\eta_T}$Pairing", IACR ePrint Archive, 2006, pp. 1-15.
Freeman, et al., "A Taxonomy of Pairing-Friendly Elliptic Curves", IACR ePring rchive, 2006, pp. 1-47.
Comuta, et al., "Pairing-friendly Elliptic Curves with Small Security Loss by Cheon's Algorithm", IACR ePrint Archive, 2006, pp. 1-13.
Boneh, et al., "Short Signature from the Weil Pairing", J. of Cryptology, vol. 17, No. 4, 2004, pp. 297-319.
Boneh, et al., "Short Signature from the Weil Pairing", Asiacrypt 2001, LNCS 2248, pp. 514-532, 2001.
Shirase, et al., "Final Exponentiation of $_{\eta_T}$Pairing", IEICE Technical Report, 2006, pp. 19-26 (with English abstract).

(Continued)

*Primary Examiner* — Chuong D Ngo
(74) *Attorney, Agent, or Firm* — Ohlandt, Greeley, Ruggiero & Perle, L.L.P.

(57) ABSTRACT

A exponentiation calculation apparatus includes a dividing unit which divides an input value as an element of a torus $T_2(Fq^r)$ (r is an odd prime, q is a power of a prime) into first and second elements (of $Fq^r$), a first calculating unit which calculates some multiplications on a base field based on the first and second elements, a second calculating unit which calculates, when the (q+1)th power of the input value as an element of $Fq^{2r}$ is divided into third and fourth elements (of $Fq^r$), the third element based on a result of the multiplications, a third calculating unit which calculates the fourth element by $Fq^r$ multiplication based on the first and second elements, and a coupling unit which couples the third element with the fourth element to obtain the (q+1)th power of the input value.

20 Claims, 7 Drawing Sheets

(56) References Cited

OTHER PUBLICATIONS

Official Action dated Oct. 6, 2009 for corresponding Japanese Application No. 2007-250088 (with English abstract).

Shirase, et al., "*Some Efficient Algorithms for the Final Exponentiation of $\eta_T$ Pairing*", Information Security Practice and Experience; May 7, 2007, pp. 254-268.

Beuchat, et al., "*A Coprocessor for the Final Exponentiation of the $\eta_T$ Pairing in Characteristic Three*", Arithmetic of Finite Fields; Jun. 21, 2007, pp. 25-39.

Shirase, et al., "*Universal $\eta_T$ Pairing Algorithm over Arbitrary Extension Degree*", Information Security Practice and Experience; Aug. 28, 2006, pp. 1-15.

Granger, et al., "*On Small Characteristic Algebraic Tori in Pairing-based Cryptography*"; LMS Journal of Computation and Mathematics, Mar. 9, 2006, p. 1461.

Baktir, et al., "*Optimal Tower Fields*"; IEEE Transactions on Computers, Oct. 1, 2004, vol. 53, No. 10, pp. 1231-1243.

Granger, et al., "*Hardware and Software Normal Basis Arithmetic for Pairing-Based Cryptography in Characteristic Three*"; IEEE Transactions on Computers, Jul. 1, 2005, vol. 54, No. 7, pp. 852-860.

Search Report dated Feb. 15, 2010 from corresponding EP Application No. 08165873.5.

\* cited by examiner

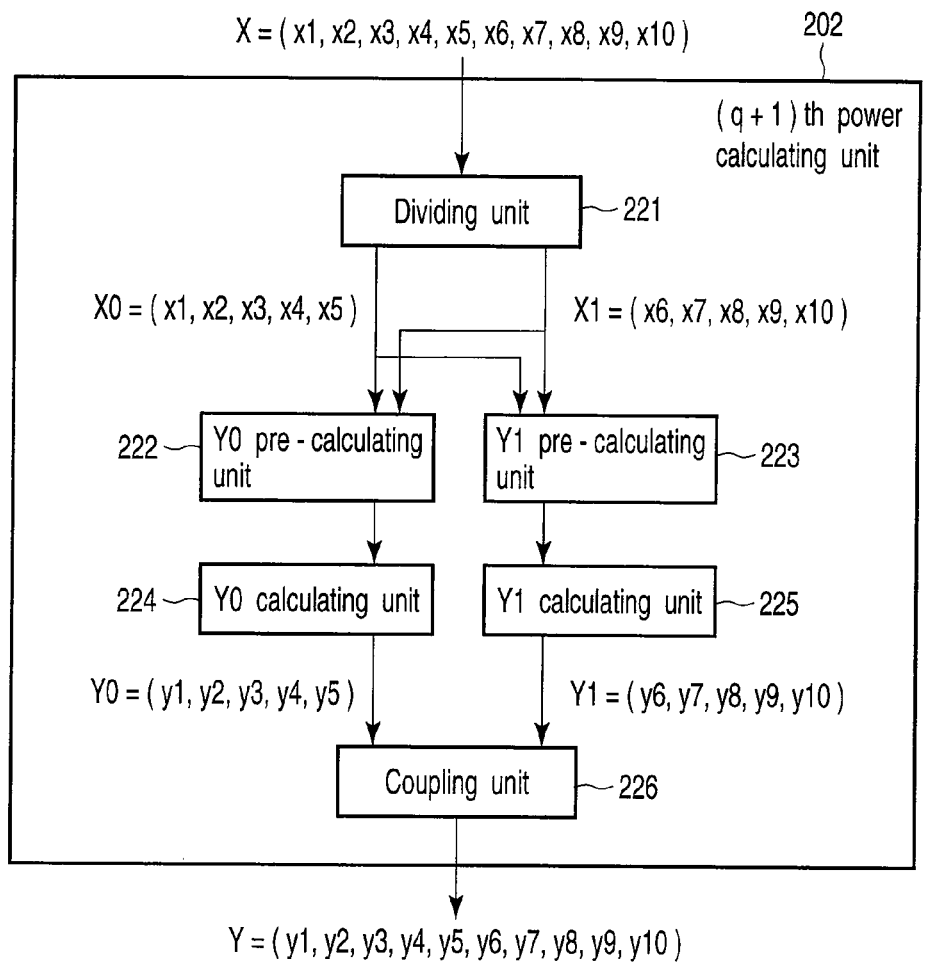
F I G. 4

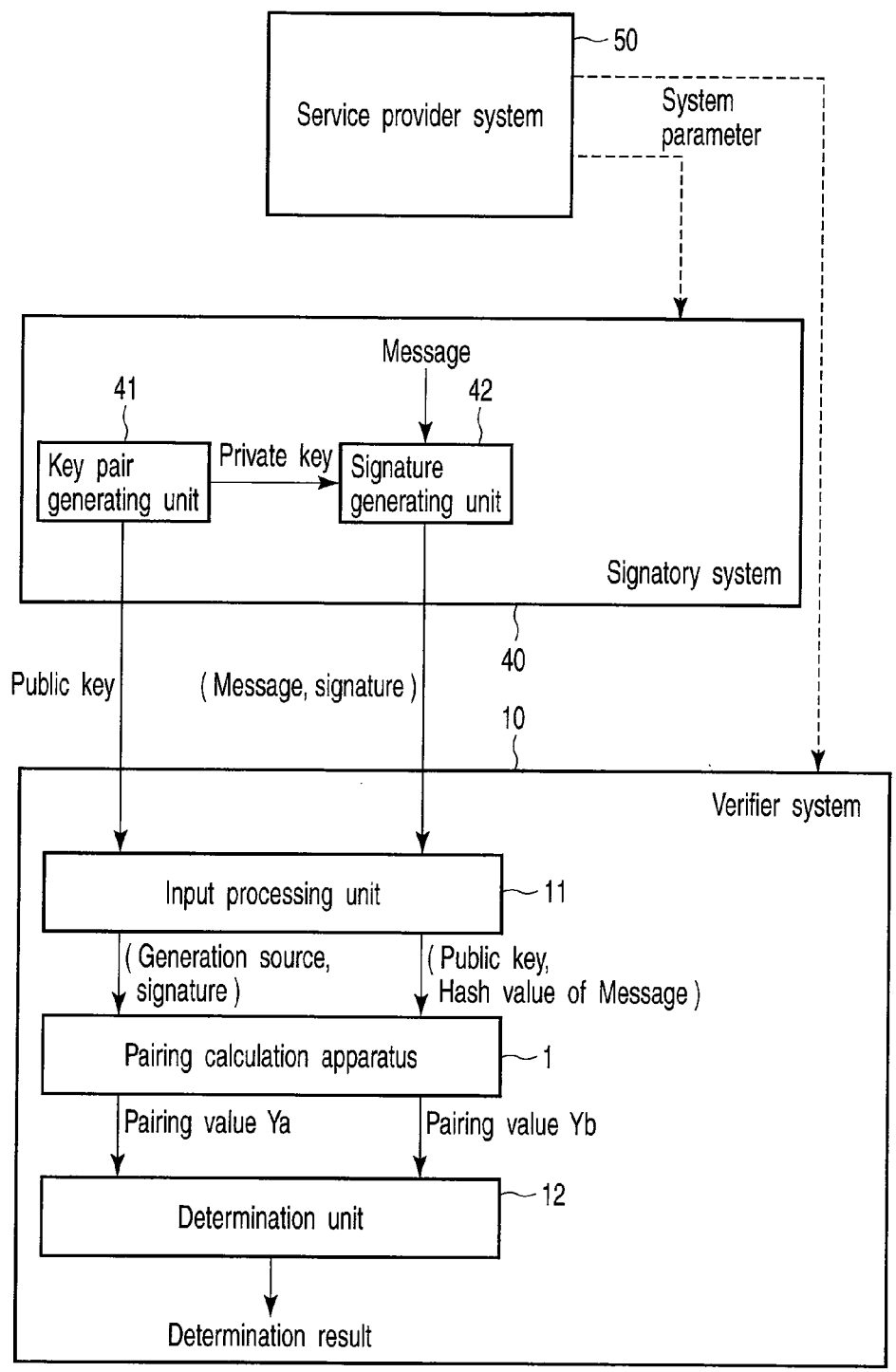
F I G. 6

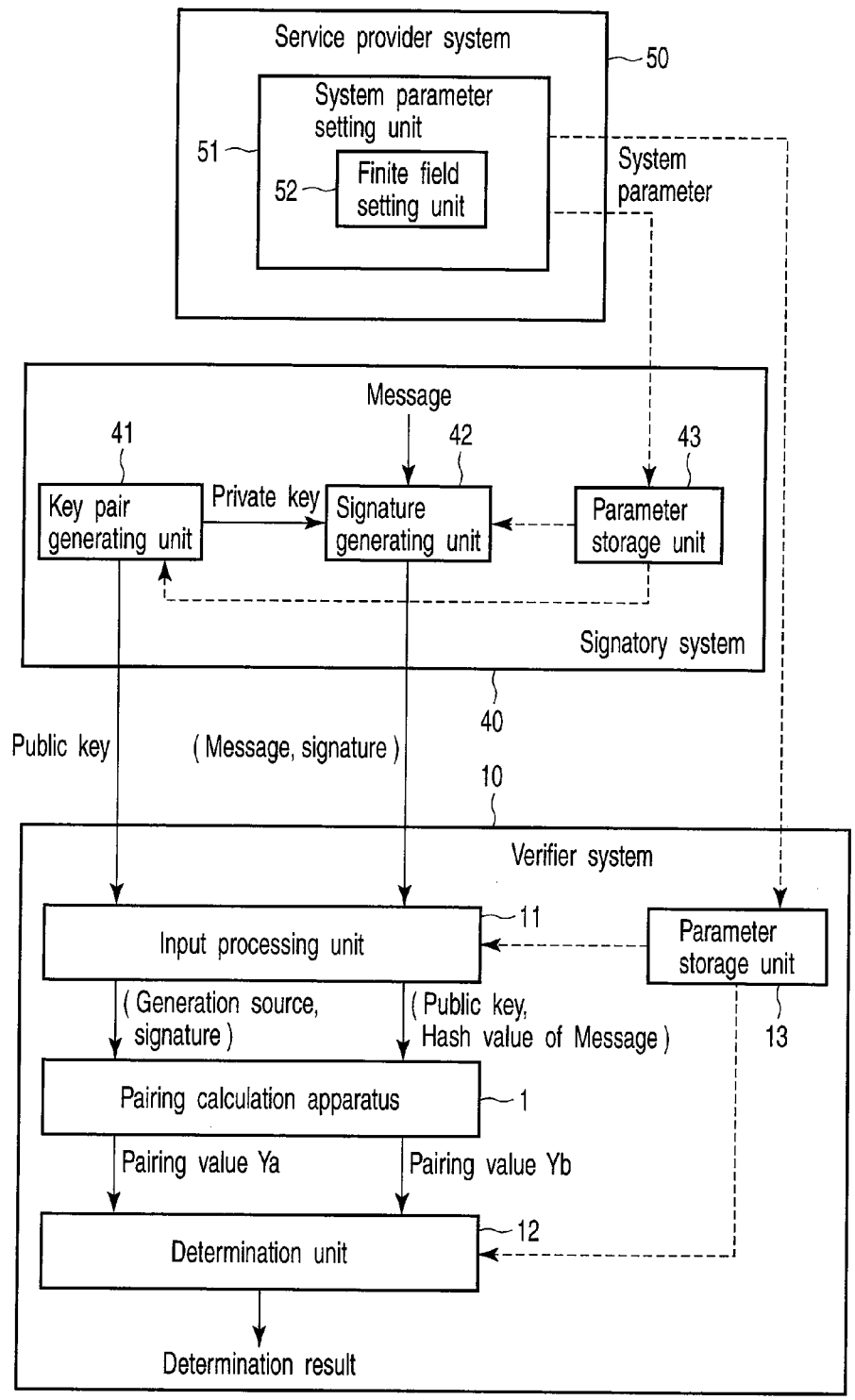
F I G. 7

EXPONENTIATION CALCULATION APPARATUS AND EXPONENTIATION CALCULATION METHOD

CROSS-REFERENCE TO RELATED APPLICATIONS

This application is based upon and claims the benefit of priority from prior Japanese Patent Application No. 2007-250088, filed Sep. 26, 2007, the entire contents of which are incorporated herein by reference.

BACKGROUND OF THE INVENTION

1. Field of the Invention

The present invention relates to a exponentiation calculation apparatus and exponentiation calculation method.

2. Description of the Related Art

Nowadays, an encryption protocol (e.g., an ID based cryptogram, or a short signature) utilizing effectiveness of pairing has been proposed. Pairing using an elliptic curve of a large embedded degree k is effective in terms of safety. For example, a constitution method for an elliptic curve of k=2×r (r is an odd prime) has been proposed (see D. Freeman, M. Scott, E. Teske, "A taxonomy of pairing-friendly elliptic curves", IACR ePrint Archive 2006/372) (reference [1]).

Several algorithms of pairing have been known. For example, Tate pairing over a finite field is such mapping as represented by Expression (1).

$$<P,Q>_m : E(Fq)[m] \times E(Fq\char`\^k)/mE(Fq\char`\^k) \to F^*q\char`\^k/(F^*q\char`\^k)^m \quad (1)$$

Here, q is a power of a prime p, Fq is a finite field with q elements, and E(Fq) is an elliptic curve defined over the finite field Fq. m is coprime to q and it is a positive integer satisfying m|#E(Fq). The symbol ^ represents exponentiation operation. For example, q^k represents the kth power of q. An embedded degree k is a minimum positive integer satisfying m|(q^k−1). #E represents the number of points of the elliptic curve E (an order of a curve). a|b represents that a is divisor of b.

Tate pairing over the finite field is mapping of inputting an Fq rational point P on an elliptic curve E (Fq) and an Fq^k rational point Q on an elliptic curve E(Fq^k) and outputting an element on Fq^k.

In general, a procedure of a pairing calculation consists of the following two steps.

[First Stage] a Calculation of Pairing Including ambiguity (e.g., a Miller algorithm)

[Second Stage] Removal of Ambiguity

A value obtained on the first stage is an element of the finite field Fq^k. Since this value is representation including ambiguity, it is not suitable for use in an encryption protocol. Thus, on the second stage, ambiguity is removed from the value obtained on the first stage.

The calculation on the first stage will be referred to as a "pairing intermediate value calculation" and a value obtained by the pairing intermediate value calculation will be referred to as a pairing intermediate value. Further, the calculation on the second stage will be referred to as "final exponentiation". A value obtained by the final exponentiation is a "pairing value" to be acquired.

To increase a speed of the pairing calculation, speeds of both the pairing intermediate value calculation and the final exponentiation must be increased. The speed of the pairing intermediate value calculation has been greatly increased. As to the final exponentiation, a speed-up technique when, e.g., r=3 (k=6) has been proposed (see Masaaki Shirase and Tsuyoshi Takagi and Eiji Okamoto, "Some Efficient Algorithms for the Final Exponentiation of ηT Pairing", IACR ePrint Archive 2006/431)(reference [2]). However, the speed-up technique of the final exponentiation is not known.

Here, the final exponentiation is an operation of raising a pairing intermediate value represented by an element of the finite field Fq^k to the (q^k−1)/mth power in such a manner that the pairing intermediate value becomes unique as an element in a cyclic group of an order m.

For example, in reference [2], the following procedure of the final exponentiation is explained. That is, when r=3, the cyclic group of the order m is a partial group of a torus $T_6(Fq)$. Thus, the pairing value is raised to the (q^3−1)(q+1)th power in such a manner that the pairing value becomes unique as an element of the torus $T_6(Fq)$, and a result is further raised to the (q^2−q+1)/mth power.

Here, in the above-explained procedure, a calculation result becomes unique representation of a torus $T_2(Fq\char`\^3)$ when the pairing value is raised to the (q^3−1)th power. Therefore, utilizing a property that the calculation result is an element of the torus $T_2(Fq\char`\^3)$ to calculate the remaining (q+1)th power enables increasing the speed. Specifically, the number of times of multiplications in the (q+1)th power calculation can be reduced by using three relational expressions present in a set of input six numbers to replace given multiplications in the calculation by other multiplications.

A strategy for a reduction in the number of times of multiplications is not clear in reference [2]. However, according to reference [2], the number of times of multiplications in the (q+1)th power calculation can be reduced to nine times from 18 times (i.e., a double speed can be achieved in the (q+1)th power calculation).

As the technique of increasing the speed of the final exponentiation in the pairing calculation, the technique when r=3 (k=6) alone is conventionally known.

BRIEF SUMMARY OF THE INVENTION

The present invention has been made in consideration of the above situation, and has as its object to provide a exponentiation calculation apparatus and exponentiation calculation method capable of increasing the speed of the final exponentiation in the pairing calculation, not only when r=3 (k=2×r=6), but also when r≥5 (k=2×r≥10, r is an odd prime).

According to an aspect of the present invention, there is provided a exponentiation calculation apparatus which includes a dividing unit configured to divide an input value as an element of a 2rth degree extension field and as an element of a torus $T_2(Fq\char`\^r)$ (where r is an odd prime, q is a power of a prime, Fq is a finite field with q elements, and Fq^r is an rth degree extension field of the finite field Fq) into a first element of the rth degree extension field with r values and a second element of the rth degree extension field with r values, a first calculating unit configured to calculate some multiplications (i.e., multiplications and squares) on a base field based on the r values of the first element and some multiplications (i.e., multiplications and squares) on a base field based on the r values of the second element, in order to obtain a plurality of multiplication results as bases for a calculation of a third element of the rth degree extension field with r values, wherein the third element is first half portion of the (q+1)th power of the input value, a second calculating unit configured to calculate the third element based on the plurality of multiplication results, a third calculating unit configured to calculate a fourth element of the rth degree extension field with r values by an Fq^r multiplication based on the first element and the second element, wherein the fourth element is last half portion of the (q+1)th power of the input value, and a coupling unit configured to couple the third element with the fourth element to obtain the (q+1)th power of the input value.

BRIEF DESCRIPTION OF THE SEVERAL VIEWS OF THE DRAWING

FIG. 4 is a view showing a structural example of a functional block of a (q+1)th power calculating unit in the final exponentiation calculating unit;

FIG. 6 is a view showing a structural example of a functional block of a signature service system according to a second embodiment;

FIG. 7 is a view showing a structural example of a functional block of a signature service system according to a third embodiment;

DETAILED DESCRIPTION OF THE INVENTION

Embodiments according to the present invention will now be explained hereinafter with reference to the drawings.

First Embodiment

A pairing calculation apparatus according to a first embodiment will now be explained.

This embodiment increases a speed of a calculation of a (q+1)th power which is a part of a final exponentiation corresponding to the second stage of the pairing calculation.

This embodiment will be explained while taking a case where an embedded degree k=2×r (r is an odd prime) and r=5 (i.e., where k=10) as a specific example.

Figure 1:
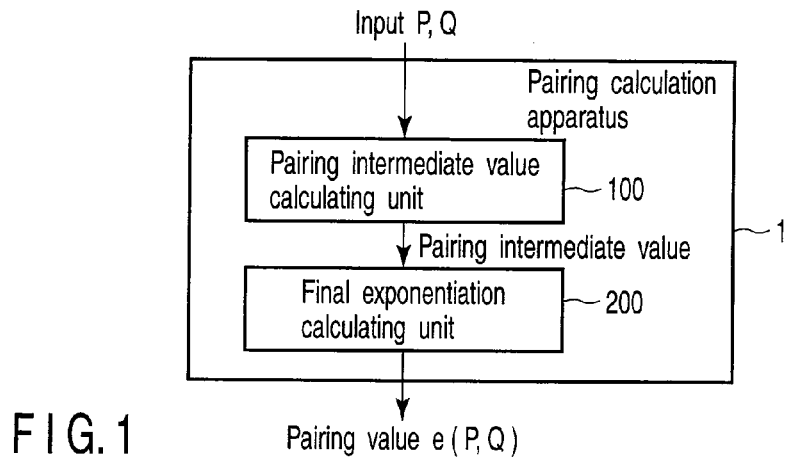
FIG. 1 is a view showing a structural example of a functional block of a pairing calculation apparatus according to a first embodiment.

As shown in FIG. 1, a pairing calculation apparatus 1 includes a pairing intermediate value calculating unit 100 and a final exponentiation calculating unit 200.

Parameters required for the pairing calculation may be set by an appropriate method.

Figure 2:
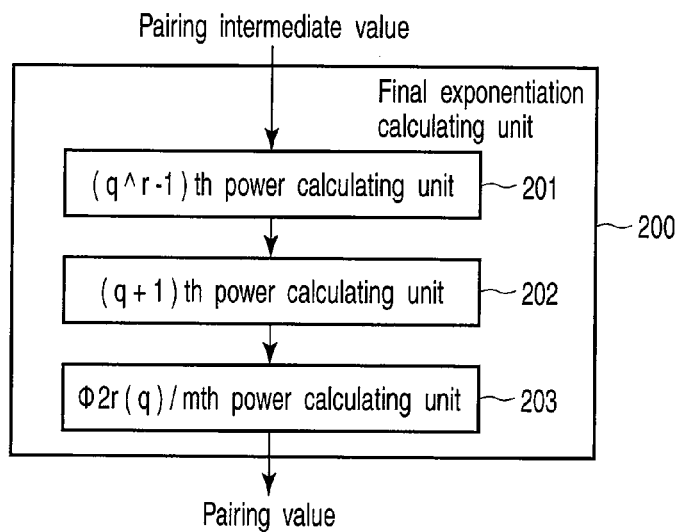
FIG. 2 is a view showing a structural example of a functional block of a final exponentiation calculating unit in the pairing calculation apparatus.

FIG. 2 shows a structural example of a functional block of the final power calculating section 200 depicted in FIG. 1. As shown in FIG. 2, the final exponentiation calculating unit 200 includes a (q^r−1)th power calculating unit 201, a (q+1)th power calculating unit 202, and a Φ2r(q)/mth power calculating unit 203. Here, Φn(q) is an nth degree cyclotimic polynomial expression.

Note that an internal structure of the pairing calculation apparatus 1 may be basically the same as a conventional structure except the (q+1)th power calculating unit 202 (especially a portion concerning a Y0 pre-calculation and a Y0 calculation which will be explained later) present in the final exponentiation calculating unit 202.

There will now be described an example of a processing procedure of the pairing calculation apparatus referring to FIG. 3.

The pairing intermediate value calculating unit 100 calculates one pairing intermediate value e(P, Q) with respect to two inputs (P, Q) and outputs the calculated value (step S1). An existing algorithm (e.g., a Miller algorithm) may be used for a calculation of the pairing intermediate value. Inputs to the pairing intermediate value calculating unit 100 is an Fq rational point P on an elliptic curve E(Fq) defined over a finite field Fq and an Fq^2r rational point Q on an elliptic curve E(Fq^2r), and an output e(P, Q) from the same is an element of a 2rth degree extension field (Fq^2r). For example, when r=5, an output from the pairing intermediate value calculating unit 100 is an element of a 10th degree extension field (Fq^10).

The final exponentiation calculating unit 200 receives the pairing intermediate value calculated by the pairing intermediate value calculating unit 100, and executes the final exponentiation with respect to the pairing intermediate value. The final exponentiation calculating unit 200 outputs a calculation result of the final exponentiation as a pairing value.

The (q^r−1)th power calculating unit 201 in the final exponentiation calculating unit 200 raises the element of the 2rth degree extension field (the pairing intermediate value calculated by the pairing intermediate value calculating unit 100 in the structural example depicted in FIG. 2) which is input thereto to the (q^r−1)th power (step S2). A calculation result of the (q^r−1)th power is also an element of the 2rth degree extension field.

The (q+1)th power calculating unit 202 raises the element of the 2rth degree extension field which is input thereto (the calculation result obtained by the (q^r−1)th power calculating unit 201 in the structural example depicted in FIG. 2) to the (q+1)th power (step S3). A calculation result of the (q+1)th power is also an element of the 2rth degree extension field.

The Φr(q)/mth power calculating unit 203 raises the element of the 2rth degree extension field which is input thereto (the calculation result obtained by the (q+1)th power calculating unit 202 in the structural example depicted in FIG. 2) to the Φ2r(q)/mth power (step S4). A calculation result of the Φ2r(q)/mth power is also an element of the 2rth degree extension field.

As explained above, since the pairing intermediate value satisfies properties as pairing but is representation including ambiguity, it is not suitable for use in an encryption protocol.

The final exponentiation is an operation of raising a pairing intermediate value represented by an element of a finite field Fq^2r to the (q^k−1)/mth power in such a manner that the intermediate value becomes unique as an element of a cyclic group of an order m. This operation enables removal of ambiguity from the pairing intermediate value and use in the encryption protocol.

Figure 3:
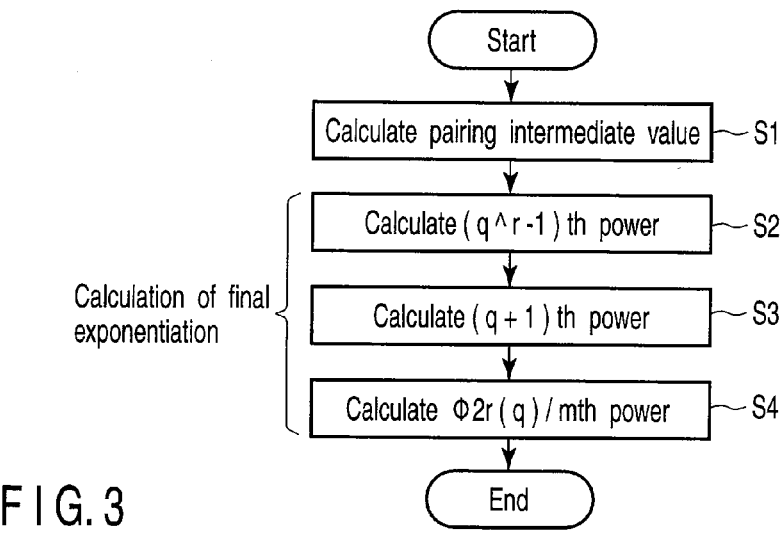
FIG. 3 is a flowchart showing an example of a processing procedure of the pairing calculation apparatus.

In this embodiment, as shown in FIGS. 2 and 3, calculations of the (q^r−1)th power, the (q+1)th power, and the Φ2r(q)/mth power are carried out, to execute the final exponentiation.

A calculation result obtained by performing the (q^r−1)th power calculation with respect to a pairing intermediate value as an element of the finite field Fq^2r becomes unique representation of a torus $T_2(Fq^r)$. Further, a calculation result obtained by raising this calculation result to the (q+1) the power is unique representation of a torus $T_{2r}(Fq)$.

For example, when r=5, a calculation result obtained by raising a pairing intermediate value as an element of a 10th degree extension field (Fq^10) to the (q^5−1)th power is unique representation of a torus $T_2(fq^5)$. Moreover, a calculation result obtained by raising this calculation result to the (q+1)th power is unique representation of a torus $T_{10}(Fq)$.

In the final exponentiation according to this embodiment, the (q^r−1)th power is calculated prior to the (q+1)th power. A speed of the calculation of the (q+1)th power is increased by utilizing a property that a calculation result of the (q^r−1)th power becomes unique representation of the torus $T_2(Fq^r)$.

Note that the (q^r−1)th power calculation must be executed before the (q+1)th power calculation as explained above, but an order of execution of the Φ2r(q)/mth power calculation is arbitrary. Therefore, in place of executing the calculations in order of the (q^r−1)th power, the (q+1)th power, and the Φ2r(q)/mth power like the example shown in FIGS. 2 and 3, the calculations may be executed in order of the (q^r−1)th power, the Φ2r(q)/mth power, and the (q+1)th power, or the calculations may be executed in order of the Φ2r(q)/mth power, the (q^r−1)th power, and the (q+1)th power.

In accordance with such orders, the structural example depicted in FIG. 2 may be modified. That is, the Φ2r(q)/mth power calculating unit 203 may be placed immediately before the (q+1)th power calculating unit 202 or may be placed immediately before the (q^r−1)th power calculating unit 201.

Additionally, in the structural example depicted in FIG. 2, the (q^r−1)th power calculating unit 201 and the Φ2r(q)/mth power calculating unit 203 are independently provided. In place of this structure, one power calculating unit ((q^r−1) Φ2r(q)/mth power calculating unit) in which the (q^r−1)th power calculating unit 201 is combined with the Φ2r(q)/mth power calculating unit 203 may be provided.

The (q+1)th power calculating unit according to this embodiment will now be explained in detail hereinafter.

FIG. 4 shows a structural example of a functional block of the (q+1)th power calculating unit 202 depicted in FIG. 2. As shown in FIG. 4, the (q+1)th power calculating unit 202 includes a dividing unit 221, a Y0 pre-calculating unit 222, a Y1 pre-calculating unit 223, a Y0 calculating unit 224, a Y1 calculating unit 225, and a coupling unit 226.

Figure 5:
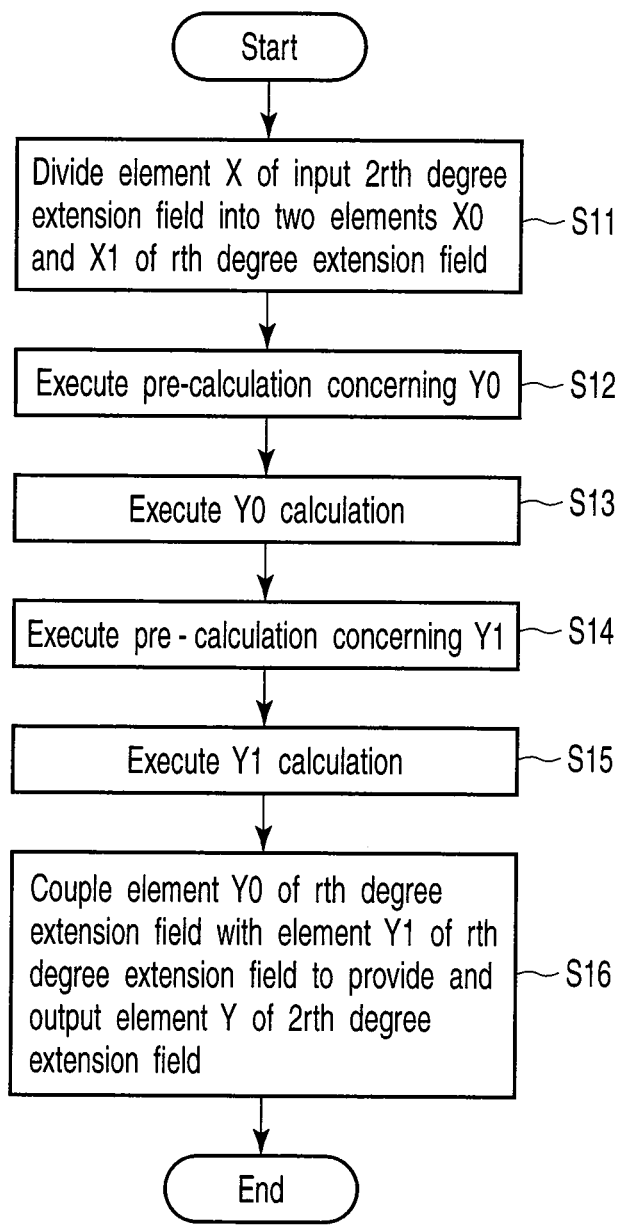
FIG. 5 is a flowchart showing an example of a processing procedure of a (q+1)th power calculation according to the first embodiment.

Further, FIG. 5 shows an example of a processing procedure of the (q+1)th power calculating unit 202.

Here, assuming that r=5, inputs/outputs with respect to the (q+1)th power calculating unit 202 are elements of a 10(=2× r)th degree extension field.

When r=5, a set X of 10(=2×r) numbers which are input to the (q+1)th power calculating unit 202 is represented as follows.

$$X=(x1,x2,x3,x4,x5,x6,x7,x8,x9,x10)$$

Furthermore, when r=5, a set of 10(=2×r) numbers output from the (q+1)th power calculating unit 202 is represented as follows.

$$Y=(y1,y2,y3,y4,y5,y6,y7,y8,y9,y10)$$

Moreover, expressions X0=(x1, x2, x3, x4, x5), X1=(x6, x7, x8, x9, x10), Y0=(y1, y2, y3, y4, y5), and Y1=(y6, y7, y8, y9, y10) are used. X0, X1, Y0, and Y1 are all elements of a fifth degree extension field.

Upon receiving the element X of the 2rth degree extension field, the dividing unit 221 divides the element X of the 2rth degree extension field into the element X0 of an rth degree extension field and the element X1 of the rth degree extension field (step S11).

For example, when r=5, upon receiving the element X=(x1, x2, x3, x4, x5, x6, x7, x8, x9, x10) of the 10th degree extension field, the dividing unit 221 divides this element X into the two elements X0=(x1, x2, x3, x4, x5) and X1=(x6, x7, x8, x9, x10) of the fifth degree extension field.

On the assumption that the element Y0 of the rth degree extension field and the element Y1 of the rth degree extension field can be obtained by dividing the element Y of the 2rth degree extension field as an output of the (q+1)th power calculation into two, the Y0 pre-calculating unit 222 executes a pre-calculation concerning Y0 in order to obtain a value that is a basis for calculating the element Y0 of the rth degree extension field (step S12).

In this pre-calculation, several multiplications over a base field in the pre-calculation required for the multiplication over the 2rth degree extension field are replaced by other multiplications by utilizing redundancy that an element of $T_2(Fq^r)$ can be represented by an expression of $Fq^{2r}$. As a result, the number of times of multiplications can be reduced. Specifically, for example, some multiplications based on the r values included in X0 are executed, and some multiplications based on the r values included in X1 are executed, in the pre-calculation.

The Y0 calculating unit 224 calculates Y0 by a linear addition of a plurality of arithmetic values obtained by the Y0 pre-calculating unit 222 (step S13).

On the assumption that the element Y0 of the rth degree extension field and the element Y1 of the rth degree extension field can be obtained by dividing the element Y of the 2rth degree extension field as an output of the (q+1)th power calculation into two, the Y1 pre-calculating unit 223 executes a pre-calculation concerning Y1 in order to obtain a value that is a basis for calculating the element Y1 of the rth degree extension field (step S14). In this pre-calculation, for example, a plurality of multiplications based on the r values included in X0 and the r values included in X1 are executed.

The Y1 calculating unit 225 calculates Y1 based on a linear addition of a plurality of arithmetic values obtained by the Y1 pre-calculating unit 223 (step S15).

The coupling unit 226 couples the element Y0 of the rth degree extension field calculated by the Y0 calculating unit 224 with the element Y1 of the rth degree extension field calculated by the Y1 calculating unit 225 to provide the element Y of the 2rth degree extension field, and outputs this element (step S16). For example, when r=5, the coupling unit 226 couples the element Y0=(y1, y2, y3, y4, y5) of the fifth degree extension field with the element Y1=(y6, y7, y8, y9, y10) of the fifth degree extension field to provide the element Y1=(y1, y2, y3, y4, y5, y6, y7, y8, y9, y10) of the 10th degree extension field, and outputs this element).

Note that, when the step S11 is first executed, the step S12 is executed before the step S13, the step S14 is executed before the step S15, an the step S16 is executed at last, an execution order different from that depicted in FIG. 5 may be adopted, or the plurality of steps may be simultaneously executed.

As explained above, in the final exponentiation according to this embodiment, the (q^r−1)th power calculation is executed before the (q+1)th power calculation. As a result, at a stage where the (q^r−1)th power calculation is executed, its calculation result becomes unique representation of the torus $T_2(Fq^r)$. A calculation amount can be reduced by utilizing the property that the calculation result of the (q^r−1)th power is the element of the torus $T_2(Fq^r)$ to replace several multiplications (i.e., squares) in the Y0 pre-calculation by other multiplications (i.e., multiplications and squares).

A structure/operation of the (q+1)th power calculating unit 202 will now be explained in detail while taking a case where r=5 as an example.

First, a primitive polynomial and a base of the 2rth degree extension field are determined in such a manner that Frobenius mapping (a qth power) of an rth degree extension field can represent an arithmetic operation having a smaller calculation amount than a multiplication of elements (e.g., replacement of elements and/or a weighting addition/subtraction of elements).

When r=5, for example, a primitive polynomial of a second degree extension field of a fifth degree extension field is set as represented by Expression (2).

$$\sigma^2=-1, \xi^{10}+\xi^9+\xi^8+\xi^7+\xi^6+\xi^5+\xi^4+\xi^3+\xi^2+\xi+1=0 \qquad (2)$$

Where $\xi$ is a primitive 11th root of 1, and $\sigma$ is a square root of $-1$.

Further, like Expression (3), a base is set by using $\xi$ and $\sigma$.

$$\{(\xi+\xi^{10}),(\xi^2+\xi^9),(\xi^3+\xi^8),(\xi^4+\xi^7),(\xi^5+\xi^6),(\xi+\xi^{10})\sigma,$$
$$(\xi^2+\xi^9)\sigma,(\xi^3+\xi^8)\sigma,(\xi^4+\xi^7)\sigma,(\xi^5+\xi^6)\sigma\} \qquad (3)$$

At this time, it is assumed that an input X=(x1, x2, x3, x4, x5, x6, x7, x8, x9, x10). X0=(x1, x2, x3, x4, x5) and X1=(x6, x7, x8, x9, x10) are elements of the fifth degree extension field.

Here, x1 to x10 are elements of a finite field with q elements. As a simple example, when q is a prime, each of x1 to x10 can be an integer from 0 to q−1.

When q≡2 mod 11, Frobenius mapping of X0 (X0 raised to the qth power) becomes X0^q=(x5, x1, x4, x2, x3) which is counterchanging of the elements of X0 (x1, x2, x3, x4, x5). Furthermore, when q≡2 mod 11, Frobenius mapping of X1 (X1 raised to the qth power) becomes X1^q=(x10, x6, x9, x7, x8) which is counterchanging of the elements of X1=(x6, x7, x8, x9, x10).

Here, since the input X has been already raised to the (q^r−1)=(q^5+1) by the (q^r−1)th power calculating unit 201, it is an element of the torus $T_2(Fq^r)=T_2(Fq^5)$.

Here, when r=5, the element X of the torus $T_2(Fq^5)$ has a property that it becomes 1 when raised to the (q^5+1)th power. This is likewise applied when r is an odd prime other than 5, and the element X of the torus $T_2(Fq^r)$ has a property that it becomes 1 when raised to the (q^r+1)th power.

Specifically representing this by using the primitive polynomial of Expression (2) and the base of Expression (3), Expression (4) can be provided. Here, X=X0+X1×σ is used.

$$X0^2+X1^2=1 \qquad (4)$$

When assigning X0=(x1, x2, x3, x4, x5) and X1=(x6, x7, x8, x9, x10) to Expression (4), such five relationships as represented by the following Expression (5) can be obtained.

1−2x4²−2x9²−2x1²−2x6²−2x2²−2x7²−2x3²−2x8²−
x5²−x10²+2x1x2+2x4x3+2x6x7+2x9x8+2x3x2+
2x8x7+2x5x4+2x10x9=0,

1−2x4²−2x9²−x1²−x6²−2x2²−2x7²−2x3²−2x8²−x5²−
2x10²+2x2x4+2x3x5+2x7x9+2x8x10+2x3x1+
2x8x6+2x5x4+2x10x9=0,

1−x4²−x9²−2x1²−2x6²−2x2²−2x7²−2x3²−2x8²−x5²−
2x10²+2x1x2+2x3x5+2x6x7+2x8x10+2x5x2+
2x10x7+2x4x1+2x6x9=0,

1−2x4²−2x9²−2x1²−2x6²−x2²−x7²−2x3²−2x8²−x5²−
2x10²+2x5x1+2x4x3+2x10x6+2x9x8+2x3x1+
2x8x6+2x5x2+2x10x7=0,

1−2x4²−2x9²−2x1²−2x6²−2x2²−2x7²−x3²−x8²−2x5²−
2x10²+2x5x1+2x2x4+2x10x6+2x7x9+2x3x2+
2x8x7+2x4x1+2x6x9=0, (5)

In regard to Expression (5), when an expression obtained by subtracting the third expression from the first expression, an expression obtained by subtracting the third expression from the second expression, and an expression obtained by subtracting the fifth expression from the fourth expression are respectively calculated, such three relational expressions as represented by the following Expression (6) can be obtained.

−x4²−x9²+x5²+x10²+2x4x3−2x3x5+2x9x8−2x8x10+
2x3x2+2x8x7−2x5x2−2x10x7+2x5x4−2x4x1+
2x10x9−2x6x9=0,

−x4²−x9²+x1²+x6²+2x1x2−2x2x4+2x6x7−2x7x9+
2x3x1+2x8x6−2x5x2−2x10x7+2x5x4−2x4+
2x109−2x6x9=0, x2²−x7²+x3²+x8²+2x4x3−2x2x4+2x9x8−2x7x9+
2x3x1+2x8x6−2x3x2−2x8x7+2x5x2−2x10x7+
2x4x1−2x6x9=0, (6)

Further, x5^2+x10^2, x1^2+x6^2, and 3^2+x8^2 can be replaced by other multiplications by using Expression (6).

Note that using three relational expressions, i.e., an expression obtained by subtracting the fourth expression from the first expression, an expression obtained by subtracting the fourth expression from the second expression, and an expression obtained by subtracting the fifth expression from the third expression in Expression (5) instead of Expression (6) enables replacing x5^2+x10^2, x1^2+x6^2, and x3^2+x8^2 with other multiplications.

Here, expressing the input X raised to the (q+1)th power by using elements of the fifth degree extension field, the following Expression (7) can be obtained, for example.

$$X^{\wedge}(q+1) = \{X0^{\wedge}(q+1) + X1^{\wedge}(q+1)\} + \qquad (7)$$
$$\{X0^{\wedge}q \cdot X1 - X0 \cdot X1^{\wedge}q\}\sigma$$
$$= (X0^{\wedge}q \cdot X0 + X1^{\wedge}q \cdot X1) +$$
$$(X0^{\wedge}q \cdot X1 - X0 \cdot X1^{\wedge}q)\sigma$$

Here, a first term on a right-hand side of Expression (7) is represented as Y0, and a second term of the same is represented as Y1.

First, a calculation of Y0 will be explained.

In regard to Y0, when each of a multiplication of X0^q=(x5, x1, x4, x2, x3) and X0=(x1, x2, x3, x4, x5) and a multiplication of X1^q=(x10, x6, x9, x7, x8) and X1=(x6, x7, x8, x9, x10) is calculated by using a Karatsuba method, a multiplication over Fq is executed for 15 times (i.e., 30 times in total) in a pre-calculation. Here, when Expression (6) is used to replace x5^2+x10^2, x1^2+x6^2, and x3^2+x8^2 with other multiplications, the multiplication over Fq in the pre-calculation is executed for 24 times in total.

Y0=(y1, y2, y3, y4, y5) is obtained based on the following Expression (8).

y1=2x4²+2x9²−2x5x1−x4x3−3x2x4−x3x5−2x10x6−x
9x8−3x7x9−x8x10−x3x1−x8x6+x3x2+x8x7+
4x5x2+4x7x10−2x5x4+2x4x1−2x10x9+2x6x9, y2=2x2²+2x7²−x5x1−2x1x2−x4x3−4x2x4−x3x5−x
10x6−2x6x7−x9x8−4x7x9−x8x10+2x3x1+2x8x6+
2x3x2+2x8x7−3x5x2+3x7x10−x5x4+x 10x9, y3=x4²+x9²+x2²+x7²−x5x1+x1x2−5x2x4−2x3x
5−x10x6+x6x7−5x7x9−2x8x10−x3x2−x8x7+
5x5x2+5x10x7, y4=2x4²+2x9²−x5x1−x1x2−4x4x3−2x2x4+x3x5−x
10x6−x6x7−4x9x8−2x7x9+x8x10+x3x1+x8x6+
2x5x2+2x10x7−2x5x4+3x4x1−2x10x9+3x6x9, $$y5 = x4^2 + x9^2 - x2^2 + x7^2 - 2x5x1 - 3x4x3 - x2x4 - 2x10x6 - x6x7 - 3x9x8 - x7x9 + 2x3x1 + 2x8x6 - 2x3x2 - 2x8x7 + 2x5x2 + 2x10x7 - x5x4 - 3x4x1 - x10x9 + 3x6x9, \quad (8)$$

As the pre-calculation of $Y0$, a calculation represented by, e.g., the following Expression (9) is executed.

$$z1 = x1x2,$$
$$z2 = x1x3,$$
$$z3 = x1x4,$$
$$z4 = x1x5,$$
$$z5 = x2x2,$$
$$z6 = x2x3,$$
$$z7 = x2x4,$$
$$z8 = x2x5,$$
$$z9 = x3x4,$$
$$z10 = x3x5,$$
$$z11 = x4x4,$$
$$z12 = x4x5,$$
$$z13 = x6x7,$$
$$z14 = x6x8,$$
$$z15 = x6x9,$$
$$z16 = x6x10,$$
$$z17 = x7x7,$$
$$z18 = x7x8,$$
$$z19 = x7x9,$$
$$z20 = x7x10,$$
$$z21 = x8x9,$$
$$z22 = x8x10,$$
$$z23 = x9x9,$$
$$z24 = x9x10, \quad (9)$$

When a result of the pre-calculation represented by Expression (9) is used, $Y0 = (y1, y2, y3, y4, y5)$ can be obtained based on the following Expression (10).

$$y1 = 2z11 + 2z23 - 2z4 - z9 - 3z7 - z10 - 2z16 - z21 - 3z19 - z22 - z2 - z14 + z6 + z18 + 4z8 + 4z20 - 2z12 + 2z3 - 2z24 + 2z15,$$

$$y2 = 2z5 + 2z17 - z4 - 2z1 + z9 - 4z7 - z10 - z16 - 2z12 + z21 - 4z19 - z22 + 2z2 + 2z14 - 2z6 - 2z18 + 3z8 + 3z20 + z12 + z24,$$

$$y3 = z11 + z23 + z5 + z17 - z4 + z1 - 5z7 - 2z10 - z16 + z13 - 5z19 - 2z22 - z6 - z18 + 5z8 + 5z24,$$

$$y4 = 2z11 + 2z23 - z4 - 4z9 - 2z7 + z10 - z16 - z13 - 4z21 - 2z19 + z22 + z2 + z14 + 2z8 + 2z20 - 2z12 + 3z3 - 2z24 + 3z15,$$

$$y5 = z11 + z23 + z17 - 2z4 - z1 - 3z9 - z7 - 2z16 - z13 - 3z21 - z19 + 2z2 + 2z14 - z6 - 2z18 + 2z8 + 2z20 - z12 + 3z3 - z24 + 3z15, \quad (10)$$

A calculation of $Y1$ will now be explained.

Using an $Fq5$ multiplier to calculate $Y1$ can suffice. Since the $Y1$ calculating unit 225 does not use a result obtained by the $Y0$ calculating unit 224, the $Y0$ calculating unit 224 and the $Y1$ calculating unit 225 can execute processing in parallel.

$Y1$ can be obtained based on the following Expression (11).

$$y6 = -2x5x6 + 2x10x1 - 2x1x7 + 2x6x2 - 3x4x8 + 3x9x3 - 3x2x9 + 3x7x4 - x3x10 + x8x5 - x3x6 + x1x8 - x3x7 + x2x8,$$

$$y7 = -x5x6 + x10x1 - 2x1x7 + 2x6x2 - 3x4x8 + 3x9x3 - 2x2x9 + 2x7x4 - 3x3x10 + 3x8x5 - x5x7 + x10x2 - x5x9 + x10x4,$$

$$y8 = -2x5x6 + 3x10x1 - 3x1x7 + 3x6x2 - 2x4x8 + 2x9x3 - x2x9 + x7x4 - 2x3x10 + 2x8x5 + x3x7 - x2x8 + x5x7 - x10x2,$$

$$y9 = -3x5x6 + 3x10x1 - x1x7 + x6x2 - 2x4x8 + 2x9x3 - 2x2x9 + 2x7x4 - 3x3x10 + 3x8x5 + x3x6 - x1x8 - x1x9 + x6x4,$$

$$y10 = -2x5x6 + 2x10x1 - 3x1x7 + 3x6x2 - x4x8 + x9x3 - 3x2x9 + 3x7x4 - 2x3x10 + 2x8x5 + x5x9 + x1x9 - x10x4 - x6x4, \quad (11)$$

As a pre-calculation of $Y1$, a calculation represented by the following Expression (12) is executed, for example.

$$w1 = x1x6,$$
$$w2 = x2x7,$$
$$w3 = x3x8,$$
$$w4 = x4x9,$$
$$w5 = x5x10,$$
$$w6 = (x1 + x2)(x6 - x7),$$
$$w7 = (x1 + x3)(x6 - x8),$$
$$w8 = (x1 + x4)(x6 - x9),$$
$$w9 = (x1 + x5)(x6 - x10),$$
$$w10 = (x2 + x3)(x7 - x8),$$
$$w11 = (x2 + x4)(x7 - x9),$$
$$w12 = (x2 + x5)(x7 - x10),$$
$$w13 = (x3 + x4)(x8 - x9),$$
$$w14 = (x3 + x5)(x8 - x10),$$
$$w15 = (x4 + x5)(x9 - x10) \quad (12)$$

When a result of the pre-calculation of Expression (12) is used, $Y1 = (y6, y7, y8, y9, y10)$ can be obtained by the following Expression (13).

$$y6 = -2w9 + 2w6 - 3w13 + 3w11 + w14 - w7 - w10 + w1 - w5,$$

$$y7 = -3w9 + 2w6 - 3w13 + 2w11 + 3w14 - w12 - w15 - w1 + w2 - 2w5,$$

$$y8 = -3w9 + 3w6 - 2w13 + w11 + 2w14 + w10 + w12 + w3 - w4 - w5,$$

$$y9 = -3w9 + w6 - 2w13 + 2w11 + 3w14 + w7 + w8 - w2 + w4,$$

$$y10 = -2w9 + 3w6 - w13 + 3w11 + 2w14 + w15 - w8 - w3 + w5 \quad (13)$$

An effect of a reduction in multiplications in the calculation of the (q+1)th power will now be explained.

In this embodiment, for example, when r=5, a property that a calculation result of the $(q^5-1)$th power becomes unique representation of the torus $T_2(Fq^5)$ is utilized, and $x1^2$, $x3^2$, $x5^2$, $x6^2$, $x8^2$, and $x10^2$ are substituted by other multiplications based on five relational expressions present in the input X=(x1, x2, x3, x4, x5, x6, x7, x8, x9, x10) of the (q+1)th power calculation, thereby reducing a calculation amount. Specifically, when a conventional pre-calculation based on the Karatsuba method is used, the number of times of multiplications for the Y0 calculation is 30, the number of times of multiplications for the Y1 calculation is 15, and a total number is 45. On the other hand, according to this embodiment, the number of times of multiplications for the Y0 calculation is 24, the number of times of multiplications for the Y1 calculation is 15, and a total number is 39.

Meanwhile, the (q+1)th power calculating unit 202 in this embodiment is a device which calculates an element of the torus $T_2(Fq^r)$ raised to the (q+1) the power at a high speed, and hence it can be utilized for other calculations than the final exponentiation of pairing. For example, when an element of $Fq^{2r}$ is given, the (q+1)th power calculating unit 202 can be generally used by determining whether the given element is an element of the torus $T_2(Fq^r)$ in place of calculating the $(q^r-1)$th power of the given element.

Second Embodiment

Pairing e which is a two-input and one-output function has a property that linearity is achieved with respect to each input (bilinearity) as follows.

$$e(P1+P2,Q)=e(P1,Q)e(P2,Q)$$

$$e(P,Q1+Q2)=e(P,Q1)e(P,Q2)$$

Based on this property, the following relationship can be achieved.

$$e(aP,bQ)=e(bP,aQ)=e(P,Q)^{ab}$$

For an encryption protocol, this relationship is very useful.

An example where the pairing calculation apparatus 1 according to the first embodiment is applied to a signature service will now be explained.

A signature scheme using pairing is disclosed in detail in, e.g., "D. Boneh, B. Lynn and H. Shacham. Short signatures from the Weil pairing. Asiacrypt 2001, LNCS 2248, 514-532, 2001" or "D. Boneh, B. Lynn and H. Shacham. Short signatures from the Weil pairing. J. of Cryptology, Vol. 17, No. 4, 297-319, 2004".

As shown in FIG. 6, a service provider system 50, a signatory system 40, and a verifier system 10 are present in the signature service system. In this signature service system, a pairing calculation is executed in verification of a signature by the verifier system 10.

Although FIG. 6 shows one signatory system 40 alone, the plurality of signatory systems may be present. Further, although FIG. 6 shows one verifier system 10 alone, the plurality of verifier systems may be present.

The service provider system 50 and the signatory system 40 can communicate with each other, the service provider system 50 and the verifier system 10 can communicate with each other, and the signatory system 40 and the verifier system 10 can communicate with each other, through a network. The network may be, e.g., the Internet.

Each of the service provider system 50, the signatory system 40, and the verifier system 10 can be formed of a computer.

One terminal may have both a function of the signatory system 40 and a function of the verifier system 10.

Note that the signature service system shown in FIG. 6 may basically have the same structure as a conventional structure except for a portion concerning the (q+1)th power calculating unit (see 202 in FIG. 2) in the pairing calculation apparatus 1.

As shown in FIG. 6, the signatory system 40 includes a key pair generating unit 41 and a signature generating unit 42.

The verifier system 10 includes an input processing unit 11, the pairing calculation apparatus 1 according to the first embodiment, and a determination unit 12.

The service provider system 50 provides necessary system parameter information (e.g., system parameters required for a signature service (e.g., all or some of pairing, an elliptic curve, a finite field, a generation source of a group consisting of rational points of the elliptic curve, a hash function, and others)) to the signatory system 40 and the verifier system 10.

The key pair generating unit 41 in the signatory system 40 generates a private key and a public key. For example, it selects a private key x and generates a public key $v=g^x$ from a generation source g and the private key x.

The signature generating unit 42 in the signatory system 40 generates a signature for a message as a signature target. For example, it obtains a hash value h(M) of a message M as a signature target and determines $h(M)^x$ as a signature.

The signatory system 40 supplies a public key, a message, and a signature to the verifier system 10. For example, it supplies the public key v, the message M, and the signature $h(M)^x$.

The verifier system 10 acquires a public key, a message, and a signature from the signatory system 40. For example, it acquires the public key $v=g^x$, the message M, and the signature $h(M)^x$.

The input processing unit 11 in the verifier system 10 first inputs a first input (P1, Q1) to the pairing calculating unit 1. For example, it inputs (the generation source g, the signature $h(M)^x$). A first pairing value Ya for the first input is input to the determination unit 12.

Then, the input processing unit 11 inputs a second input (P2, Q2) to the pairing calculation apparatus 1. For example, it obtains a hash value h(M) from the acquired message M and inputs (the public key $g^x$, the hash value h(M) of the message). A second pairing value Yb for the second input is input to the determination unit 12.

The determination unit 12 compares the two pairing values Ya and Yb, determines that the signature is valid when Ya=Yb, and determines that the signature is not valid when Ya≠Yb.

Here, if the signature is valid in the above example, the following expression can be achieved.

$$Ya=e(g,h(M)^x)=e(g,h(M))^x=e(g^x,h(M))=Yb$$

The example where the pairing calculation apparatus is applied to the signature service has been explained in this embodiment, but this pairing calculation apparatus can be of course applied to any other signature service or various kinds of encryption protocols other than the signature service.

Third Embodiment

In this embodiment, an example where the service provider system 50 can set parameters of the pairing calculation apparatus 1 in the second embodiment will be explained.

Points different from the first and second embodiments will be mainly explained in this embodiment.

FIG. 7 shows a structural example of a functional block of a signature service system according to this embodiment.

Figure 8:
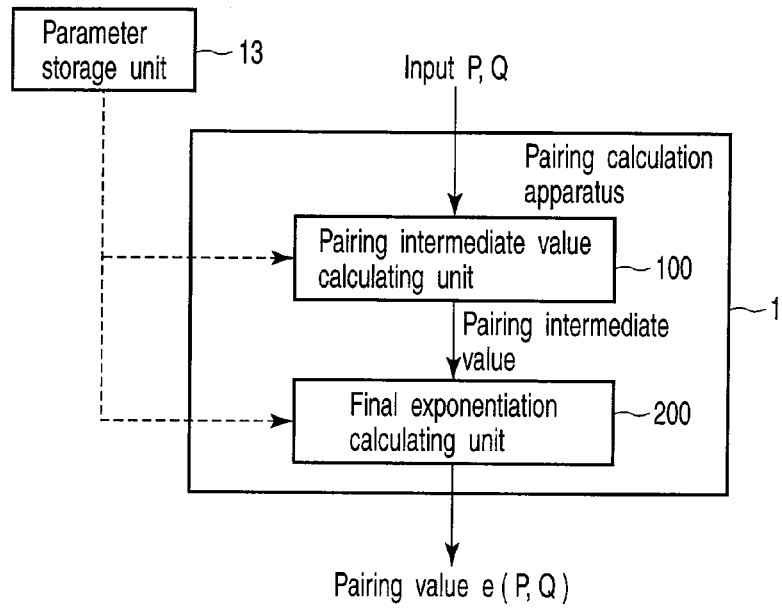
FIG. 8 is a view showing a structural example of a functional block of a pairing calculation apparatus according to the third embodiment.

Furthermore, FIG. 8 shows a structural example of the functional block of the pairing calculation apparatus 1 depicted in FIG. 7.

As shown in FIG. 7, the service provider system 50 includes a system parameter setting unit 51 in addition to the structures depicted in FIG. 6. Moreover, the system parameter setting unit 51 includes a finite field setting unit 52.

The system parameter setting unit 51 sets system parameters required for the signature service (e.g., all or some of pairing, an elliptic curve, a finite field, a generation source of a group consisting of rational points of the elliptic curve, a hash function, and others), and releases them to the public.

The finite field setting unit 52 sets parameters of a finite field that allows defining an elliptic curve. r (r is an odd prime) may be determined in accordance with security requirements. A primitive polynomial and a base of a 2rth degree extension field are determined in such a manner that Frobenius mapping (a qth power) of an rth degree extension field can be represented by an arithmetic operation (e.g., counterchanging of elements and/or weighting addition/subtraction of elements) whose calculation amount is smaller than that of a multiplication of elements. For example, when r=5, the primitive polynomial and the base are set as represented by Expressions (2) and (3).

The system parameter setting unit 51 does not have to be necessarily operated every time a signature is generated or verified.

A signatory system 40 includes a parameter storage unit 43 in addition to the structures depicted in FIG. 6. The parameter storage unit 43 stores system parameters required by the signatory system 40 itself in system parameters which are released to the public by the system parameter setting unit 51 in the service provider system 50 and required for the signature service.

Additionally, a key pair generating unit 41 and a signature generating unit 42 in the signatory system 40 execute processing based on the parameters stored in the parameter storage unit 43.

A verifier system 10 includes a parameter storage unit 13 in addition to the structures depicted in FIG. 6. The parameter storage unit 13 stores system parameters required by the signatory system 40 itself in system parameters which are released to the public by the system parameter setting unit 51 in the service provider system 50 and required for the signature service.

Further, the input processing unit 11 and (a pairing intermediate value calculating unit 100 and a final exponentiation calculating unit 200 in) the pairing calculation apparatus 1 in the verifier system 10 execute processing based on the parameters stored in the parameter storage unit 13.

Figure 9:
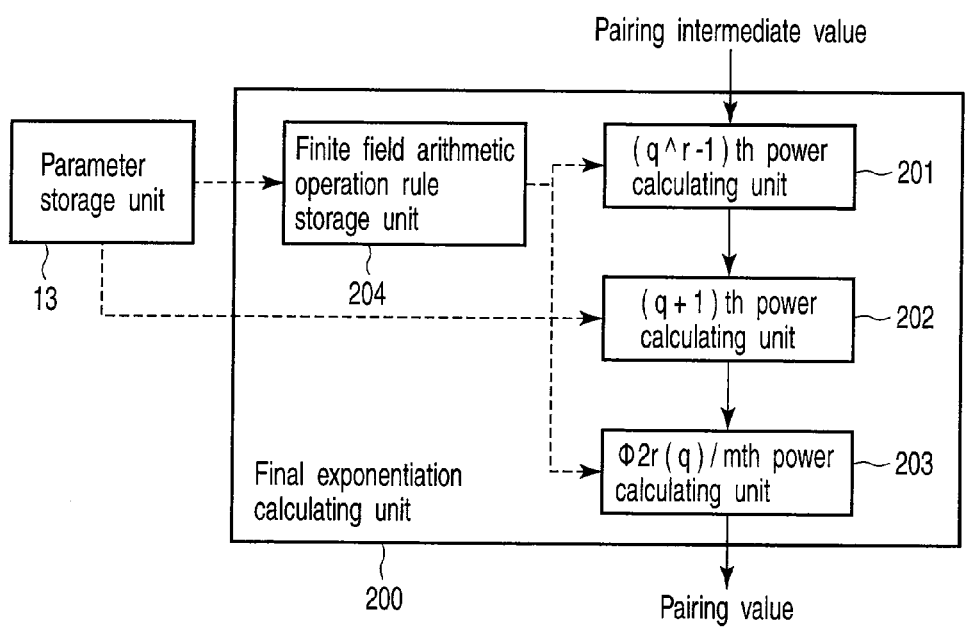
FIG. 9 is a view showing a structural example of a functional block of a final exponentiation calculating unit in the pairing calculation apparatus.

FIG. 9 shows a structural example of a functional block of the final exponentiation calculating unit 200 in the pairing calculation apparatus 1. The final exponentiation calculating unit 200 includes a finite field arithmetic operation rule storage unit 204 in addition to the structures depicted in FIG. 6. The finite field arithmetic operation rule storage unit 204 stores arithmetic operation rules of a second degree extension field and an rth degree extension field determined based on the primitive polynomial and the base.

Figure 10:
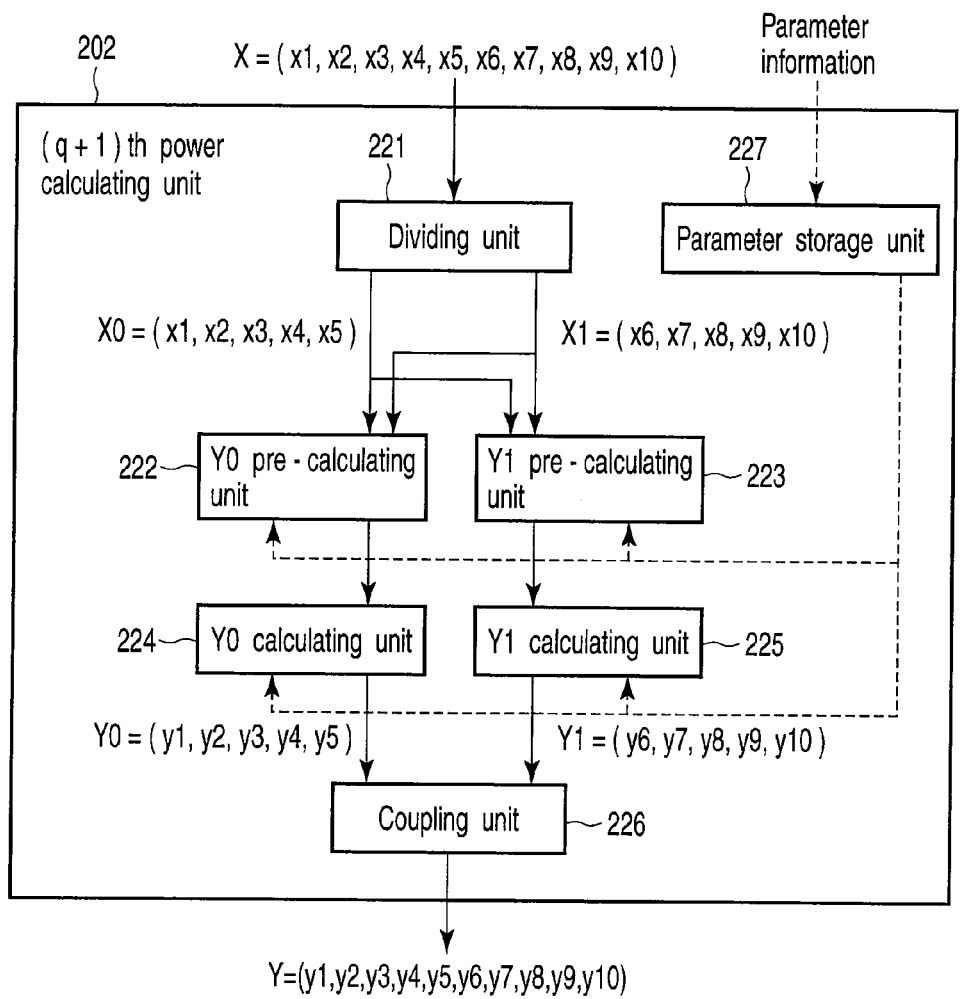
FIG. 10 is a view showing a structural example of a functional block of a (q+1)th power calculating unit in the final exponentiation calculating unit.

FIG. 10 shows a structural example of a functional block of a (q+1)th power calculating unit 202 depicted in FIG. 9. The (q+1)th power calculating unit 202 includes a parameter storage unit 227 in addition to the structures depicted in FIG. 6. The parameter storage unit 227 stores the primitive polynomial and the base of the 2rth degree extension field. The base is determined in such a manner that Frobenius mapping (the qth power) of the rth degree extension field can be represented by an arithmetic operation (e.g., counterchanging of elements and/or weighting addition/subtraction of elements) whose calculation amount is smaller than that of a multiplication of elements. For example, when r=5, the primitive polynomial and the base are determined as represented by Expressions (2) and (3).

An operation of the signatory system 40 and an operation of the verifier system 10 in this embodiment are basically equal to those in the second embodiment.

The example where the pairing calculation apparatus is applied to the signature service has been explained in this embodiment, but this pairing calculation apparatus can be applied to any other signature service or various kinds of encryption protocols other than the signature service.

Note that each of the above-explained functions can be like realized when it is written as software and processed by a computer having an appropriate mechanism.

Furthermore, this embodiment can be also carried out as a program that allows a computer to execute a predetermined procedure, a program that allows the computer to function as predetermined means, or a program that allows the computer to realize a predetermined function. Moreover, this embodiment can be also carried out as a computer readable recording medium having the program recorded therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exponentiation calculation apparatus comprising:
a computer having a dividing unit, a first calculating unit, a second calculating unit, a third calculating unit, and a coupling unit that are processed by the computer so that:
the dividing unit divides an input value as an element of a 2rth degree extension field and as an element of a torus $T2(Fq^r)$ (where r is an odd prime, q is a power of a prime, Fq is a finite field with q elements, and $Fq^r$ is an rth degree extension field of the finite field Fq) into a first element of the rth degree extension field with r values and a second element of the rth degree extension field with r values;
the first calculating unit calculates only some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;
the second calculating unit calculates the third element based only on the plurality of multiplication results;
the third calculating unit calculates, in parallel to calculations by the first and second calculating units, a fourth element of the rth degree extension field with r values by an $Fq^r$ multiplication based on the first element and the second element, wherein the fourth element is last half portion of the (q+1)th power of the input value; and the coupling unit couples the third element with the fourth element to obtain the (q+1)th power of the input value.

2. The apparatus according to claim 1, wherein the first calculating unit substitutes specific multiplications over the base field by another multiplications based on redundancy that the element of the torus T2(Fq^r) is represented by an extension field Fq^2r to execute the calculation.

3. The apparatus according to claim 1, wherein the first calculating unit substitutes specific multiplications over the base field by another multiplications to execute the calculation by utilizing an expression X^(q^r+1)=1 achieved in regard to X as an element of the torus T2(Fq^r) where X is the input value.

4. The apparatus according to claim 3, wherein, when r=5, the first calculating unit uses five relational expressions achieved in a set of 10 values (x1, x2, x3, x4, x5, x6, x7, x8, x9, x10) included in the input value to substitute x12, x32, x52, x62, x82, and x102 by other multiplications and thereby omits calculations of x12, x32, x52, x62, x82, and x102 to execute the calculation.

5. The apparatus according to claim 3, wherein, when r=5, a primitive polynomial of a 10th degree extension field is set to σ2=−1, ξ10+ξ9+ξ8+ξ7+ξ6+ξ5+ξ4+ξ3+ξ2+ξ+1=0, and a base of the 10th degree extension field is set to {(ξ+ξ10), (ξ2+ξ9), (ξ3+ξ8), (ξ4+ξ7), (ξ5+ξ6), (ξ+ξ10)σ, (ξ2+ξ9)σ, (ξ3+ξ8)σ, (ξ4+ξ7)σ, (ξ5+ξ6)σ}, where ξ is a primitive 11th root and σ is a square root of −1.

6. The apparatus according to claim 5, further comprising storage unit configured to store the modulus and the base.

7. The apparatus according to claim 5, wherein a set of 10 values included in the input value is assumed to be (x1, x2, x3, x4, x5, x6, x7, x8, x9, x10), the dividing unit divides the input value into a first element (x1, x2, x3, x4, x5) and a second element (x6, x7, x8, x9, x10), and the first calculating unit performs:
a calculation of x1x2, x1x3, x1x4, x1x5, x2x2, x2x3, x2x4, x2x5, x3x4, x3x5, x4x4, and x4x5 in regard to the first element (x1, x2, x3, x4, x5); and
a calculation of x6x7, x6x8, x6x9, x6x10, x7x7, x7x8, x7x9, x7x10, x8x9, x8x10, x9x9, x9x10 in regard to the second element (x6, x7, x8, x9, x10).

8. The apparatus according to claim 1, wherein a modulus and a base of the 2rth degree extension field are set to enables representing a qth power of the rth degree extension field by an arithmetic operation whose calculation amount is smaller than multiplications of the elements.

9. The apparatus according to claim 8, wherein the arithmetic operation is counterchanging of the elements and/or a weighting addition/subtraction of the elements.

10. The apparatus according to claim 8, further comprising storage unit configured to store the modulus and the base.

11. The apparatus according to claim 1, wherein r=5 is achieved.

12. An exponentiation calculation apparatus comprising:
a computer having a dividing unit, a first calculating unit, a second calculating unit, a third calculating unit, and a coupling unit that are processed by the computer so that:
the dividing unit divides an input value as an element of a 2rth degree extension field and as an element of a torus T2(Fq^r) (where r is an odd prime, q is a power of a prime, Fq is a finite field with q elements, and Fq^r is an rth degree extension field of the finite field Fq) into a first element of the rth degree extension field with r values and a second element of the rth degree extension field with r values;

the first calculating unit calculates some multiplications on a base field based on the r values of the first element and some multiplications on a base field based on the r values of the second element, in order to obtain a plurality of multiplication results as bases for a calculation of a third element of the rth degree extension field with r values, wherein the third element is first half portion of the (q+1)th power of the input value;
the second calculating unit calculates the third element based on the plurality of multiplication results;
the third calculating unit calculates a fourth element of the rth degree extension field with r values by an Fq^r multiplication based on the first element and the second element, wherein the fourth element is last half portion of the (q+1)th power of the input value; and
the coupling unit couples the third element with the fourth element to obtain the (q+1)th power of the input value, wherein the third element Y0 is represented as Y0=X0^q·X0+X1^q·X1 by using the first element X0 and the second element X1, and
the first calculating unit executes the calculation by utilizing a fact that a qth power X0^q of the first element and a qth power X1^q of the second element are represented by element counterchanging of the first element X0 and element counterchanging of the second element X1, respectively.

13. The apparatus according to claim 12, wherein, when r=5, in order to represent a qth power of a fifth degree extension field by counterchanging of the elements,
a modulus of a 10th degree extension field is set to σ2=−1, ξ10+ξ9+ξ8+ξ7+ξ6+ξ5+ξ4+ξ3+ξ2+ξ+1=0, and
a base of the 10th degree extension field is set to {(ξ+ξ10), (ξ2+ξ9), (ξ3+ξ8), (ξ4+ξ7), (ξ5+ξ6), (ξ+ξ10)σ, (ξ2+ξ9)σ, (ξ3+ξ8)σ, (ξ4+ξ7)σ, (ξ5+ξ6)σ},
where ξ is a primitive 11th root and σ is a square root of −1.

14. The apparatus according to claim 1, wherein the third calculating unit includes:
a fourth calculating unit configured to calculate some multiplications based on the r values of the first element and the r values of the second element, in order to obtain a plurality of multiplication results as bases for a calculation of the fourth element; and
a fifth calculating unit configured to calculate the fourth element based on the plurality of multiplication results.

15. The apparatus according to claim 12, further comprising storage unit configured to store the modulus and the base.

16. An exponentiation calculation method executed by a computer having a dividing unit, a first calculating unit, a second calculating unit, a third calculating unit, and a coupling unit, the method comprising:
inputting, by the dividing unit, an input value as an element of a 2rth degree extension field and as an element of a torus T2(Fq^r) (where r is an odd prime, q is a power of a prime, Fq is a finite field with q elements, and Fq^r is an rth degree extension field of the finite field Fq);
dividing, by the dividing unit, the input value into a first element of the rth degree extension field with r values and a second element of the rth degree extension field with r values;
providing, from the dividing unit to the first and third calculating unit, the first and second element;
calculating, by the first calculating unit, only some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;

providing, from the first calculating unit to the second calculating unit, the plurality of multiplication results;

calculating, by the second calculating unit, the third element based only on the plurality of multiplication results;

providing, from the second calculating unit to the coupling unit, the third element;

calculating, by the third calculating unit, in parallel to calculations by the first and second calculating units, a fourth element of the rth degree extension field with r values by an Fq^r multiplication based on the first element and the second element, wherein the fourth element is last half portion of the (q+1)th power of the input value;

providing, from the third calculating unit to the coupling unit, the fourth element;

coupling, by the coupling unit, the third element with the fourth element to obtain the (q+1)th power of the input value; and outputting, by the coupling unit, the obtained (q+1)th power of the input value.

17. A non-transitory computer readable storage medium storing instructions of a computer program which when executed by a computer results in performance of steps comprising:

dividing an input value as an element of a 2rth degree extension field and as an element of a torus T2(Fq^r) (where r is an odd prime, q is a power of a prime, Fq is a finite field with q elements, and Fq^r is an rth degree extension field of the finite field Fq) into a first element of the rth degree extension field with r values and a second element of the rth degree extension field with r values;

calculating some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;

calculating the third element based only on the plurality of multiplication results;

calculating, in parallel to calculations by the first and second calculating units, a fourth element of the rth degree extension field with r values by an Fq^r multiplication based on the first element and the second element, wherein the fourth element is last half portion of the (q+1)th power of the input value; and coupling the third element with the fourth element to obtain the (q+1)th power of the input value.

18. An exponentiation calculation apparatus comprising:

a computer having a dividing unit, a first calculating unit, a second calculating unit, a third calculating unit, and a coupling unit that are processed by the computer so that:

the dividing unit divides an input value as an element of a 2rth degree extension field and as an element of a torus T2(Fq^r) (where r is an odd prime, q is a power of a prime, Fq is a finite field with q elements, and Fq^r is an rth degree extension field of the finite field Fq) into a first element of the rth degree extension field with r values and a second element of the rth degree extension field with r values;

the first calculating unit calculates some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;

the second calculating unit calculates the third element based only on the plurality of multiplication results;

the third calculating unit calculates a fourth element of the rth degree extension field with r values by an Fq^r multiplication based only on the first element and the second element, wherein the fourth element is last half portion of the (q+1)th power of the input value; and the coupling unit couples the third element with the fourth element to obtain the (q+1)th power of the input value.

19. A exponentiation calculation method executed by a computer having a dividing unit, a first calculating unit, a second calculating unit, a third calculating unit, and a coupling unit, the method comprising:

inputting, by the dividing unit, an input value as an element of a 2rth degree extension field and as an element of a torus T2(Fq^r) (where r is an odd prime, q is a power of a prime, Fq is a finite field with q elements, and Fq^r is an rth degree extension field of the finite field Fq);

dividing, by the dividing unit, the input value into a first element of the rth degree extension field with r values and a second element of the rth degree extension field with r values;

providing, from the dividing unit to the first and third calculating unit, the first and second element;

calculating, by the first calculating unit, some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;

providing, from the first calculating unit to the second calculating unit, the plurality of multiplication results;

calculating, by the second calculating unit, the third element based only on the plurality of multiplication results;

providing, from the second calculating unit to the coupling unit, the third element;

calculating, by the third calculating unit, a fourth element of the rth degree extension field with r values by an Fq^r multiplication based only on the first element and the second element, wherein the fourth element is last half portion of the (q+1)th power of the input value;

providing, from the third calculating unit to the coupling unit, the fourth element;

coupling, by the coupling unit, the third element with the fourth element to obtain the (q+1)th power of the input value; and outputting, by the coupling unit, the obtained (q+1)th power of the input value.

20. A non-transitory computer readable storage medium storing instructions of a computer program which when executed by a computer results in performance of steps comprising:

dividing an input value as an element of a 2rth degree extension field and as an element of a torus T2(Fq^r) (where r is an odd prime, q is a power of a prime, Fq is a finite field with q elements, and Fq^r is an rth degree extension field of the finite field Fq) into a first element of the rth degree extension field with r values and a second element of the rth degree extension field with r values;

calculating some multiplications on a base field based only on the r values of the first element and some multiplications on a base field based only on the r values of the second element, in order to obtain a plurality of multiplication results as bases for a calculation of a third element of the rth degree extension field with r values, wherein the third element is first half portion of the (q+1)th power of the input value, and wherein the plurality of multiplication results consist only of the some multiplications on a base field based only on the r values of the first element and the some multiplications on a base field based only on the r values of the second element;

calculating the third element based only on the plurality of multiplication results;

calculating a fourth element of the rth degree extension field with r values by an Fq^r multiplication based only on the first element and the second element, wherein the fourth element is last half portion of the (q+1)th power of the input value; and coupling the third element with the fourth element to obtain the (q+1)th power of the input value.

* * * * *